United States Patent
Wang et al.

(10) Patent No.: US 8,165,374 B1
(45) Date of Patent: Apr. 24, 2012

(54) SYSTEM AND METHOD FOR CAPSULE CAMERA WITH CAPTURE CONTROL AND MOTION-COMPENSATED VIDEO COMPRESSION

(75) Inventors: Kang-Huai Wang, Saratoga, CA (US); Gordon C Wilson, San Francisco, CA (US)

(73) Assignee: Capso Vision Inc., Saratoga, CA (US)

( * ) Notice: Subject to any disclaimer, the term of this patent is extended or adjusted under 35 U.S.C. 154(b) by 0 days.

(21) Appl. No.: 13/156,439

(22) Filed: Jun. 9, 2011

(51) Int. Cl.
*G06K 9/00* (2006.01)

(52) U.S. Cl. ........ 382/128; 382/236; 348/699; 348/700; 375/240.13

(58) Field of Classification Search ............ 382/128
See application file for complete search history.

(56) References Cited

U.S. PATENT DOCUMENTS

| | | | |
|---|---|---|---|
| 7,792,344 B2 * | 9/2010 | Wang et al. | 382/128 |
| 7,796,870 B2 | 9/2010 | Wang | |
| 7,940,973 B2 * | 5/2011 | Lee et al. | 382/128 |
| 7,974,454 B1 * | 7/2011 | Lee et al. | 382/128 |
| 7,983,458 B2 * | 7/2011 | Wang et al. | 382/128 |
| 8,073,223 B2 * | 12/2011 | Wilson et al. | 382/128 |
| 2007/0098379 A1 | 5/2007 | Wang et al. | |
| 2007/0116119 A1 * | 5/2007 | Wang | 375/240.12 |
| 2008/0117968 A1 * | 5/2008 | Wang | 375/240.12 |
| 2008/0184168 A1 * | 7/2008 | Oda | 715/838 |
| 2009/0284589 A1 * | 11/2009 | Radeva et al. | 348/77 |

* cited by examiner

*Primary Examiner* — Sath V Perungavoor
(74) *Attorney, Agent, or Firm* — Blairtech Solution LLC

(57) ABSTRACT

Systems and methods for a capsule camera having on-board storage or wireless transmission to control image capture using motion information and to encode captured images based on motion compensated video compression are disclosed. In order to conserve the precious storage and power resources, the capsule camera measures motion metric to select a skip mode or a capture mode. In order to reduce computations related motion metric derivation, the motion metric is based on sub-images corresponding to a current frame and a previous captured frame instead of full-size images. When the skip mode is selected, the capsule camera exercises storage space/power conservation by skipping unnecessary image capture and/or reducing luminous energy of a light source or other means for power conservation. When the capture mode is selected, a full-size full-resolution frame is captured and compressed using motion-compensated video compression to achieve high compression ratio.

28 Claims, 9 Drawing Sheets

SYSTEM AND METHOD FOR CAPSULE CAMERA WITH CAPTURE CONTROL AND MOTION-COMPENSATED VIDEO COMPRESSION

CROSS REFERENCE TO RELATED APPLICATIONS

The present invention is related to U.S. patent application Ser. No. 11/533,304, entitled "In Vivo Autonomous Camera with On-Board Data Storage or Digital Wireless Transmission in Regulatory Approved Band", filed on Sep. 19, 2006, and U.S. Pat. No. 7,796,870, entitled "Lighting Control For In Vivo Capsule Camera", issued on Sep. 14, 2010, and U.S. Pat. No. 7,940,973, entitled "Capture Control for in vivo Camera", issued on May 10, 2011. The U.S. Non-Provisional Patent Application and U.S. Patents are hereby incorporated by reference in their entireties.

FIELD OF THE INVENTION

The present invention relates to diagnostic imaging inside the human body. In particular, the present invention relates to controlling image capture using motion information and encoding captured images based on motion compensated video compression for capsule camera having on-board storage or wireless transmission.

BACKGROUND

Devices for imaging body cavities or passages in vivo are known in the art and include endoscopes and autonomous encapsulated cameras. Endoscopes are flexible or rigid tubes that pass into the body through an orifice or surgical opening, typically into the esophagus via the mouth or into the colon via the rectum. An image is formed at the distal end using a lens and transmitted to the proximal end, outside the body, either by a lens-relay system or by a coherent fiber-optic bundle. A conceptually similar instrument might record an image electronically at the distal end, for example using a CCD or CMOS array, and transfer the image data as an electrical signal to the proximal end through a cable. Endoscopes allow a physician control over the field of view and are well-accepted diagnostic tools. However, they do have a number of limitations, present risks to the patient, are invasive and uncomfortable for the patient, and their cost restricts their application as routine health-screening tools.

An alternative in vivo image sensor that addresses many of these problems is capsule endoscope. A camera is housed in a swallowable capsule, along with a radio transmitter for transmitting data, primarily comprising images recorded by the digital camera, to a base-station receiver or transceiver and data recorder outside the body. The capsule may also include a radio receiver for receiving instructions or other data from a base-station transmitter. Instead of radio-frequency transmission, lower-frequency electromagnetic signals may be used. Power may be supplied inductively from an external inductor to an internal inductor within the capsule or from a battery within the capsule.

An autonomous capsule camera system with on-board data storage was disclosed in the U.S. patent application Ser. No. 11/533,304, entitled "In Vivo Autonomous Camera with On-Board Data Storage or Digital Wireless Transmission in Regulatory Approved Band," filed on Sep. 19, 2006. This application describes a motion detection that is conducted using a portion of each image, the portion being stored in a partial frame buffer, a metric for measuring the degree of motion between a current sub-image and a previous sub-image is used to select either Skip Mode (or Conservation Mode) or Capture Mode. U.S. Pat. No. 7,940,973, entitled "Capture Control for in vivo Camera", issued on May 10, 2011 further discloses variations of capture control. In one embodiment, a full-size full-resolution image is capture when Capture Mode is selected. When Skip Mode (Conservation Mode) is selected, the capsule camera exercises power conservation such as reducing luminous energy emitted from a light source, disregarding the input image, and/or capturing the input image in low resolution or low quality.

While the applications mentioned above use motion detection and motion estimation to eliminate some unnecessary image capture and conserved the precious on-board storage and battery power, it is desirable to further reduce storage requirement by using high efficiency compression. The need for high efficiency compression becomes more apparent when the required image resolution continues to grow. Accordingly a capsule camera that uses motion evaluation to reduce system power and unnecessary image capture, and uses motion-compensated video compression to encode the captured images is disclosed.

BRIEF SUMMARY OF THE INVENTION

The present invention provides a method and system for capsule camera control by providing a light source with a first light control to illuminate lumen walls, receiving image data corresponding to a current frame from image sensor, evaluating a motion metric, selecting an operation mode from a group comprising Capture Mode and Skip Mode based on a profile of the motion metric, providing the light source with a second light control to illuminate the lumen walls if the mode is the Capture Mode, and capturing a full-size and full-resolution frame in a compressed form based on motion-compensated compression if the mode is the Capture Mode, wherein the above steps are performed inside a capsule camera. The motion metric is evaluated based on motion vectors, SAD, MSE, count of pixels having large differences, count of zero-valued motion vectors, or center of mass associated with a current sub-image corresponding to the current frame and a previous sub-image corresponding to a previously captured frame. The Capture Mode is selected if the profile indicates an amount of motion between the current frame and the previously captured frame exceeding a threshold and the Skip Mode is selected otherwise.

The sub-image may be substantially smaller than the original frame. One aspect of the present invention is related to the control of luminous energy emitted by the light source according to the mode selected, wherein the luminous energy emitted is reduced in the Skip mode in one embodiment and the luminous energy emitted is the same in the Skip mode as the Capture mode in another embodiment. Another aspect of the present invention is related to the sub-image derivation, wherein the sub-image is derived from the image frame by cropping in one embodiment and the sub-image is derived from the image frame by subsampling in another embodiment. Another aspect of the present invention is also related to the sub-image derivation, wherein the sub-image is derived from the image frame by using a processing module in one embodiment and the sub-image is derived by applying image sensor control in another embodiment. A further aspect of the present invention is related to the capture images, wherein the full-size and full-resolution frame captured in the compressed form is stored in an on-board archival memory in one embodiment and is transmitted using a wireless transmitter in another embodiment. When the sub-image is derived using sub-sampling and motion metric is based on motion vectors, motion-compensated video compression may take advantage of the motion vectors calculated for the sub-image. In this case, motion vectors for the full-size full resolution frame may use motion vectors calculated for the sub-image as initial values.

DETAILED DESCRIPTION OF THE INVENTION

A swallowable capsule camera has been used for imaging human GI tract and the capsule camera is viewed as an attractive alternative to the conventional endoscope. The camera is housed in a swallowable capsule, along with a radio transmitter for transmitting data, primarily comprising images recorded by the digital camera, to a base-station receiver or transceiver and data recorder outside the body. The capsule may also include a radio receiver for receiving instructions or other data from a base-station transmitter. Power is often supplied from a battery within the capsule, while other means for supplying power is also available. A swallowable capsule camera with on-board storage is described in U.S. patent application Ser. No. 11/533,304 and U.S. patent application Ser. No. 12/543,508, where motion evaluation can be utilized to dynamically control image capture.

In order to reduce the power consumption associated with motion metric computation, partial frame can be used. The partial frame can be derived from a full frame by spatially reducing the image size, which can be spatial sub-sampling and/or spatial clopping. The use of partial frame not only reduces power consumption associated with motion metric computation, but also reduces the storage size required for buffering the image data. Some image sensors offer a control mechanism to output image data at reduced size. For example, a set of programmable registers may be used to select region of interest (ROI), where the location of a starting pixel, horizontal size and vertical size of picture can be selected. The use of ROI effectively achieves image clopping. Often, the image sensor also offers spatial sub-sampling feature where separate horizontal and vertical sub-sampling ratios may be used.

According to the motion metric, the capsule camera may select between a Skip Mode and a Capture Mode. In the Capture Mode, the system may capture a full-size and full-resolution image. In the Skip Mode, the system may take action to skip the frame or exercise other options to conserve power. In the disclosure, various embodiments and examples of the methods and structures mentioned above are described. It will be realized that this detailed description is illustrative only and is not intended to be in any way limiting. Other embodiments will readily suggest themselves to persons of ordinary skill in the art having the benefit of this disclosure.

Figure 1A:
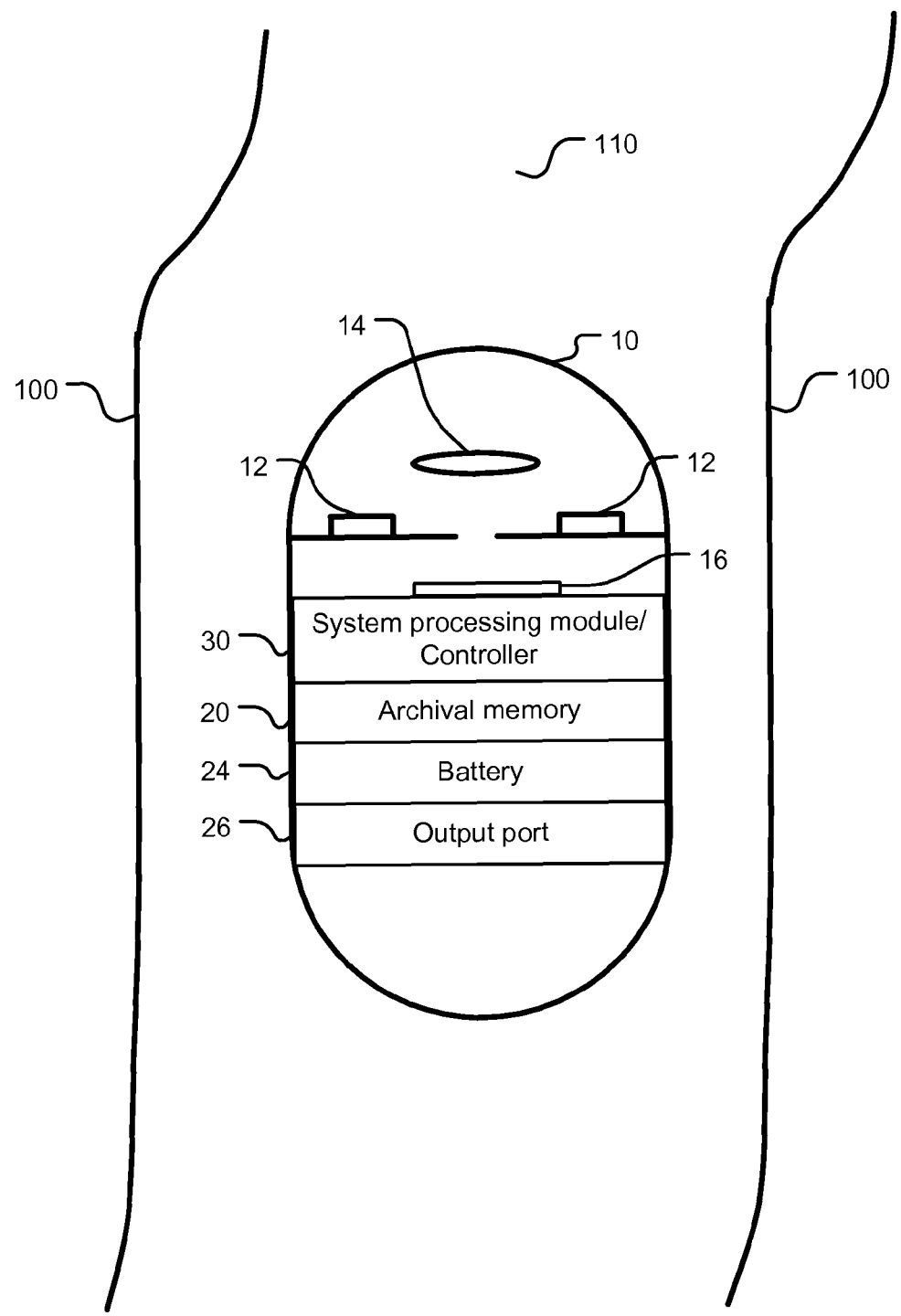
FIG. 1A illustrates an example of capsule camera system having on-board storage, according to one embodiment.

FIG. 1A shows a swallowable capsule system 110 inside body lumen 100, in accordance with one embodiment. Lumen 100 may be, for example, the colon, small intestines, the esophagus, or the stomach. Capsule system 110 is entirely autonomous while inside the body, with all of its elements encapsulated in a capsule housing 10 that provides a moisture barrier, protecting the internal components from bodily fluids. Capsule housing 10 is transparent, so as to allow light from the light-emitting diodes (LEDs) of illuminating system 12 to pass through the wall of capsule housing 10 to the lumen 100 walls, and to allow the scattered light from the lumen 100 walls to be collected and imaged within the capsule. Capsule housing 10 also protects lumen 100 from direct contact with the foreign material inside capsule housing 10. Capsule housing 10 is provided a shape that enables it to be swallowed easily and later to pass through of the GI tract. Generally, capsule housing 10 is made of non-toxic material, and is sufficiently smooth to minimize the chance of lodging within the lumen.

As shown in FIG. 1A, capsule system 110 includes illuminating system 12 and a camera that includes optical system 14 and image sensor 16. An image captured by image sensor 16 is processed by system processing module/controller 30 to determine the motion metric of the image within the optical view of the camera corresponding to a current frame and a previous frame. The system processing module/controller 30 may be implemented in software/firmware that runs on a digital signal processor (DSP) or a central processing unit (CPU), dedicated hardware, or a combination of both software and hardware. A semiconductor nonvolatile archival memory 20 is provided to allow the images to be stored on-board and retrieved at a docking station outside the body, after the capsule is recovered. System 110 includes battery power supply 24 and an output port 26. Capsule system 110 may be propelled through the GI tract by peristalsis.

Illuminating system 12 may be implemented by LEDs. In FIG. 1A, the LEDs are located adjacent the camera's aperture, although other configurations are possible. The light source may also be provided, for example, behind the aperture. Other light sources, such as laser diodes, may also be used. Alternatively, white light sources or a combination of two or more narrow-wavelength-band sources may also be used. White LEDs are available that may include a blue LED or a violet LED, along with phosphorescent materials that are excited by the LED light to emit light at longer wavelengths. The portion of capsule housing 10 that allows light to pass through may be made from bio-compatible glass or polymer.

Optical system 14, which may include multiple refractive, diffractive, or reflective lens elements, provides an image of lumen walls on image sensor 16. Image sensor 16 may be provided by charged-coupled devices (CCD) or complementary metal-oxide-semiconductor (CMOS) type devices that convert the received light intensities into corresponding electrical signals. Image sensor 16 may have a monochromatic response or include a color filter array such that a color image may be captured (e.g. using the RGB or CYM representations). The analog signals from image sensor 16 are preferably converted into digital form to allow processing in digital form. Such conversion may be accomplished using an analog-to-digital (A/D) converter, which may be provided inside the sensor (as in the current case), or in another portion inside capsule housing 10. The A/D unit may be provided between image sensor 16 and the rest of the system. LEDs in illuminating system 12 are synchronized with the operations of image sensor 16.

The system processing module/controller 30 selects an incoming image to retain only when there are enough differences between a current frame and a previous frame in order to conserve the limited storage space. The images are stored in the on-board archival memory system 20. The output port 26 shown in FIG. 1A is not operational in vivo but uploads data to a work station after the capsule is recovered, having passed from the body. The system processing module/controller 30 comprises a module that computes a metric of motion. Depending on the amount of motion as indicated by the motion metric, the system processing module/controller 30 will determine if the underlying image should be captured, i.e., stored in the on-board storage or transmitted to external storage. If the amount of motion is small so that the differences between the underlying image and a previously captured image are small, the underlying image may not be needed to store, i.e., the underlying image is not captured. Alternatively, a low-quality image may be stored if the amount of motion is small.

Archival memory system 20 can be implemented by one or more nonvolatile semiconductor memory devices. There are numerous memory types that can be used; even photographic films can be used for image sensing and storage. Since the image data are digitized for digital image processing techniques, such as motion detection, memory technologies that are compatible with digital data are selected. Of course, semiconductor memories mass-produced using planar technology is the most convenient. Such memories are low-cost and may be obtained from multiple sources. Semiconductor memories are most compatible because they share common power supply with the sensors and other circuits in capsule system 110, and require little or no data conversion when interfaced with an upload device at output port 26. Archival memory system 20 preserves the data collected during the operation, after the operation while the capsule is in the body, and after the capsule has left the body, up to the time the data is uploaded. This period of time is generally less than a few days. A nonvolatile memory is preferred because data is held without power consumption, even after the capsule's battery power has been exhausted. Suitable non-volatile memory includes flash memories, write-once memories, or program-once-read-once memories. Alternatively, archival memory system 20 may be volatile and static (e.g., a static random access memory (SRAM) or its variants, such as VSRAM, PSRAM).

Archival memory 20 may be used to hold any initialization information (e.g., boot-up code and initial register values) to begin the operations of capsule system 110. The cost of a second non-volatile or flash memory may therefore be saved. That portion of the non-volatile can also be written over during operation to store the selected captured images. After the capsule passes from the body, it is retrieved. Capsule housing 10 is opened and input port 16 is connected to an upload device for transferring data to a computer workstation for storage and analysis.

Figure 1B:
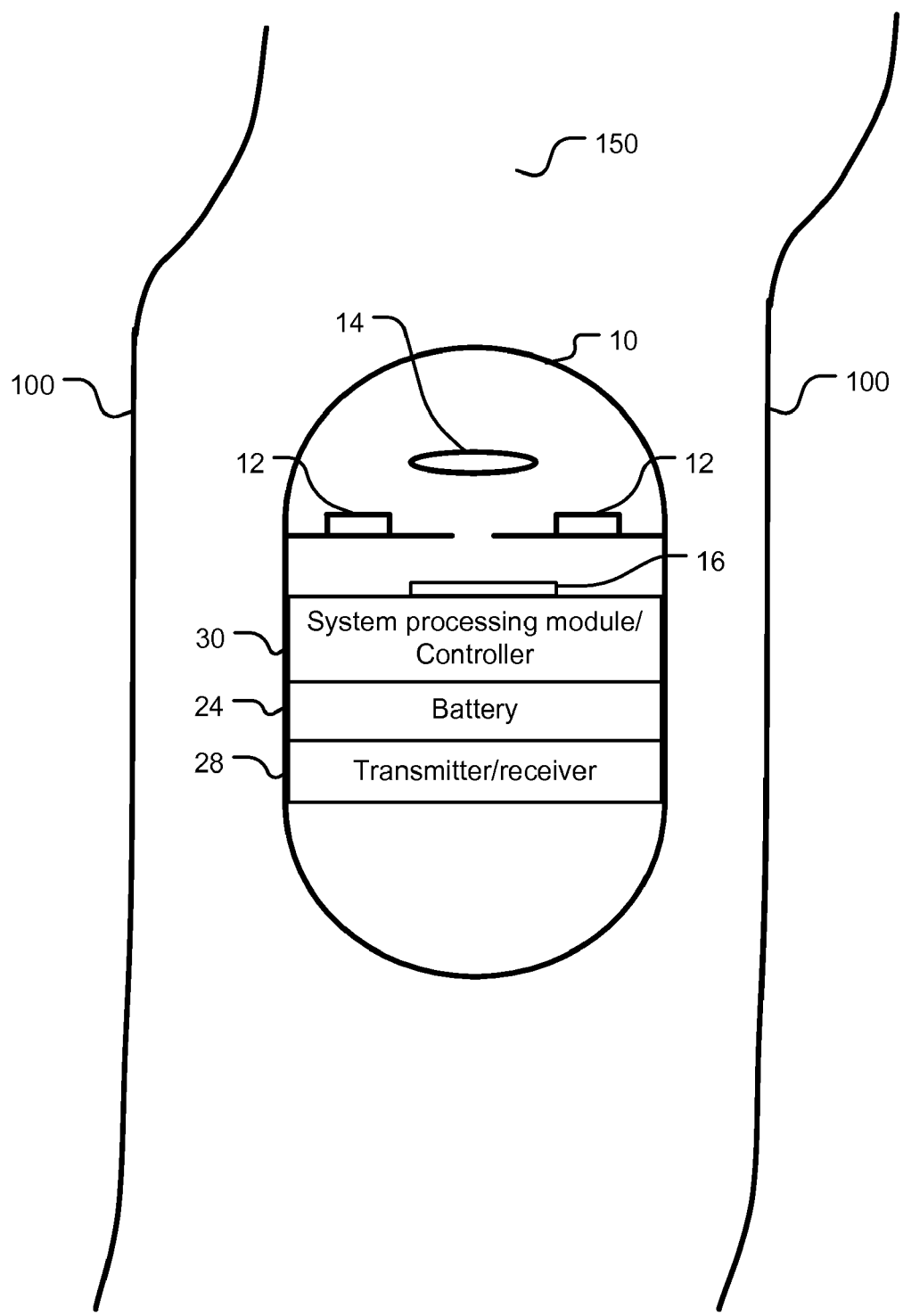
FIG. 1B illustrates an example of schematically capsule camera system having wireless transmitter/receiver, according to another embodiment.

FIG. 1B depicts an alternative capsule camera system 150 inside body lumen 100, in accordance with one embodiment. The capsule camera system in FIG. 1B is similar to that in FIG. 1A except that a transmitter/receiver 28 is used instead of an archival memory 20. In FIG. 1B, the same element as that in FIG. 1A is designated with the same reference numeral. While images captured are stored in the archival memory 20 in FIG. 1A, images captured are transmitted by the transmitter/receiver 28 in FIG. 1B to an external device for storage. The external device may be a base-station. The transmitter/receiver 28 may receive signals from the external device. As to be discussed later, the transmitter/receiver 28 may also be used to transmit image data to the external device for motion metric evaluation and to receive operation modes from the external device. In such example, the capsule camera system may also contain the archival memory 20 to store captured images and relies on the external processing unit to evaluate motion metric only. In this case, image data transmitted from the capsule camera system to the external processing unit is just for motion metric evaluation purpose.

Figure 2:
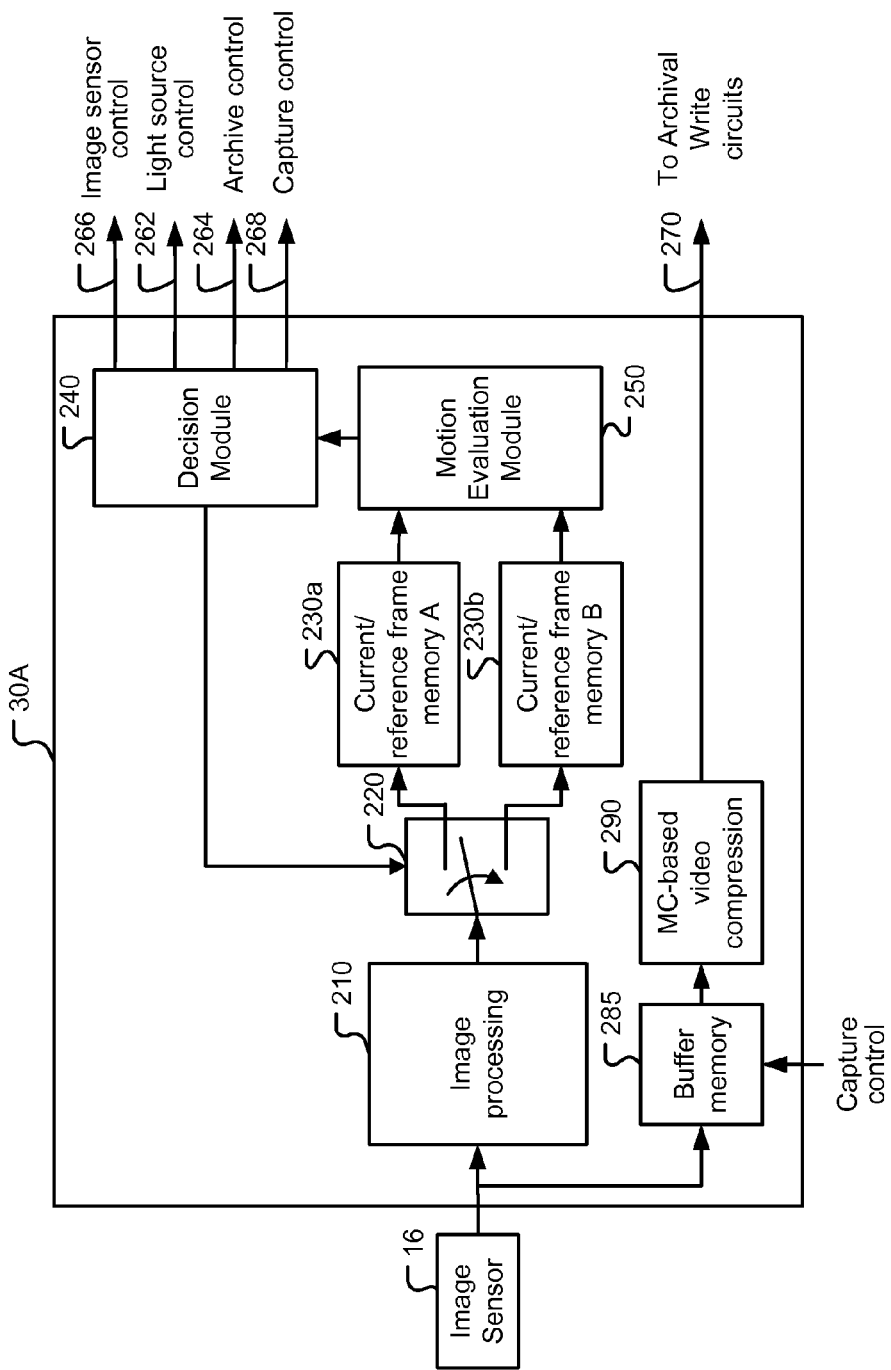
FIG. 2 illustrates an exemplary block diagram of the system processing module/controller according to one embodiment, wherein an image module is used.

FIG. 2 illustrates an exemplary system processing module/controller 30A according to one embodiment. The received image data is processed by the image processing module 210 to optionally process image data from the image sensor 16, such as the image cropping/spatial sub-sampling. The use of the image cropping/spatial sub-sampling module 210 can reduce image size and consequently reduce the computational requirements for evaluating the motion metric. The image processing module 210 may apply spatial sub-sampling to reduce the image size of the incoming data. For example, a 2:1 sub-sampling can be applied horizontally and vertically to reduce the image data to ¼ of its original size. Alternatively, the image size can also be reduced by cropping. For example, the central ¼ portion can be retained after cropping for motion metric evaluation. A combination of spatial sub-sampling and cropping can also be used to reduce the image size. After the optional cropping/spatial sub-sampling, the resulted sub-image is then stored in one of two frame memories 230a and 230b via the switch 220 and the other one of frame memories 230a and 230b contains a reference image, which is a previously stored image. The motion evaluation module 250 receives the two sub-images from frame memories 230a and 230b and evaluates motion metric accordingly.

The motion evaluation can be based on a motion detection algorithm or a motion estimation algorithm. Motion detection and motion estimation are well known in the field. There are a variety of motion estimation and motion detection algorithms in the literature. For example, there is a class of block based motion estimation algorithm to estimate the motion vector for each block, and many fast algorithms for efficient computation of the motion vector have been reported in the literature. Beside various search algorithms to determine motion vectors, an algorithm also exists that determines motion vector based on center of mass calculation. There is also a class of global motion estimation algorithm that estimates the dominant global vector for the image. While motion estimation provides more detailed description of the differences between two images, motion estimation usually involves complex computations. On the other hand, motion detection measures motion metric in order to determine whether there are significant differences between the two sub-images. Usually there is no need to determine the amount of movement between the two sub-images and consequently motion detection requires less computation. Motion detection can be based on the sum of absolute differences (SAD), mean squared error (MSE), count of pixels having difference larger than a threshold, and count of zero-valued motion vector of two respective sub-images. The motion metric can be associated with computed motion vectors, global motion vector, SAD, MSE, count of pixels having large differences, count of zero-valued motion vectors and center of mass.

The motion metric evaluated is then provided to the decision module 240 to decide an operation mode. For example, according to a profile of the motion metric, the decision module will choose either Capture Mode or Skip Mode. The Capture Mode is selected when the motion metric is larger than a threshold and otherwise, the Skip Mode is selected. While the Capture Mode and the Skip Mode are used as an example, other operation modes may also be used to practice the present invention. For example, an additional Low-Quality Capture Mode may be used that retains image at low quality if the motion metric is between a lower threshold and a higher threshold. For the Capture Mode, the system processing module/control 30 will cause a full-size full resolution image stored in the archival memory 20. The decision module 240 will provide light source control 262 to the light source, i.e., LEDs in this example, to cause the light source to produce sufficient luminous energy for image capture. The decision module 240 will also provide image sensor control signal 266 to the image sensor to operate the image sensor and synchronize the operation with the light source. Furthermore, the decision module 240 will also provide necessary archive control signal 264 to cause the image to be stored in the archival memory 20. The decision module 240 also controls the switch 220 so that the incoming image data will be written into an intended frame memory 230a or 230b. If the decision module 240 selects the Capture Mode, the image data in the current frame memory will be designated as a new reference frame memory. At the same time, the reference frame memory will be designated as a new current frame memory to receive the next incoming image.

A data path to archival memory is shown from the incoming image data, through image compression 280 and buffering memory 285 to archival write control 270. The incoming image data to be stored may be subject to optional image compression 280, such as the JPEG standard, to conservation storage space. The buffer memory 285 is used to buffer the image data. The output of the buffering memory 270 is provided to the archival memory through archival write circuit. The archival write circuit is coupled to the archive control signal 264 so that an image intended to be stored will be properly stored in the archival memory 20. While the buffer memory 285 is illustrated as an explicit block, it may also be embedded inside system memory inside the capsule camera. The size requirement of the buffer memory 285 depends on how the capsule camera is operated. In one example, the motion evaluation module 250 makes a decision based on image data corresponding to the current frame and a previous frame. The decision module 240 may determine to capture the current frame. In this case, the entire current frame has to be buffered, compressed or un-compressed, in the buffer memory 285. In another example, the decision to capture a frame can be made to the next incoming frame, i.e., a decision delayed by one frame. In this case, the incoming image data only needs to be slightly buffered before it is written into the archival memory. When compression such as JPEG is used, only a few line buffers will be needed inside the image compression 280, and the buffer memory 285 may only need to hold an amount of compressed data so that the compressed data can be properly written to the archival memory. The decision module 240 selects an operation mode may be based on a current motion metric and multiple previous motion metrics, instead of the current motion metric only. The current motion metric along with at least one previous motion metric constitute a profile of the motion metric. Very often, the motion metric data is correlated, i.e. neighboring motion metrics may have similar trend. For example, several consecutive small motion metrics may indicate that the capsule camera system is in a period of no movement or very little movement. Therefore, the decision module 240 may decide to discard more frames in this situation. The use of "a profile of motion metric" helps the decision module to make better decision.

FIG. 2 illustrates an exemplary system processing module/controller 30A where separate blocks are shown for frame memory A 230a and B 230b, and buffer memory 285. However, it is known for skilled person in the art that the above mentioned frame memory A and B, and buffer memory may all reside in a memory device such as DRAM (Dynamic Random Access Memory) or SRAM (Static Random Access Memory) in the capsule camera. These separate blocks are used in FIG. 2 to illustrate the functional aspect of these buffer or memory. Furthermore, the buffer memory 285 may be also the same as for frame memory A 230a and B 230b if the reference frame memory can satisfy the requirement of buffering the image data to be archived.

Figure 3:
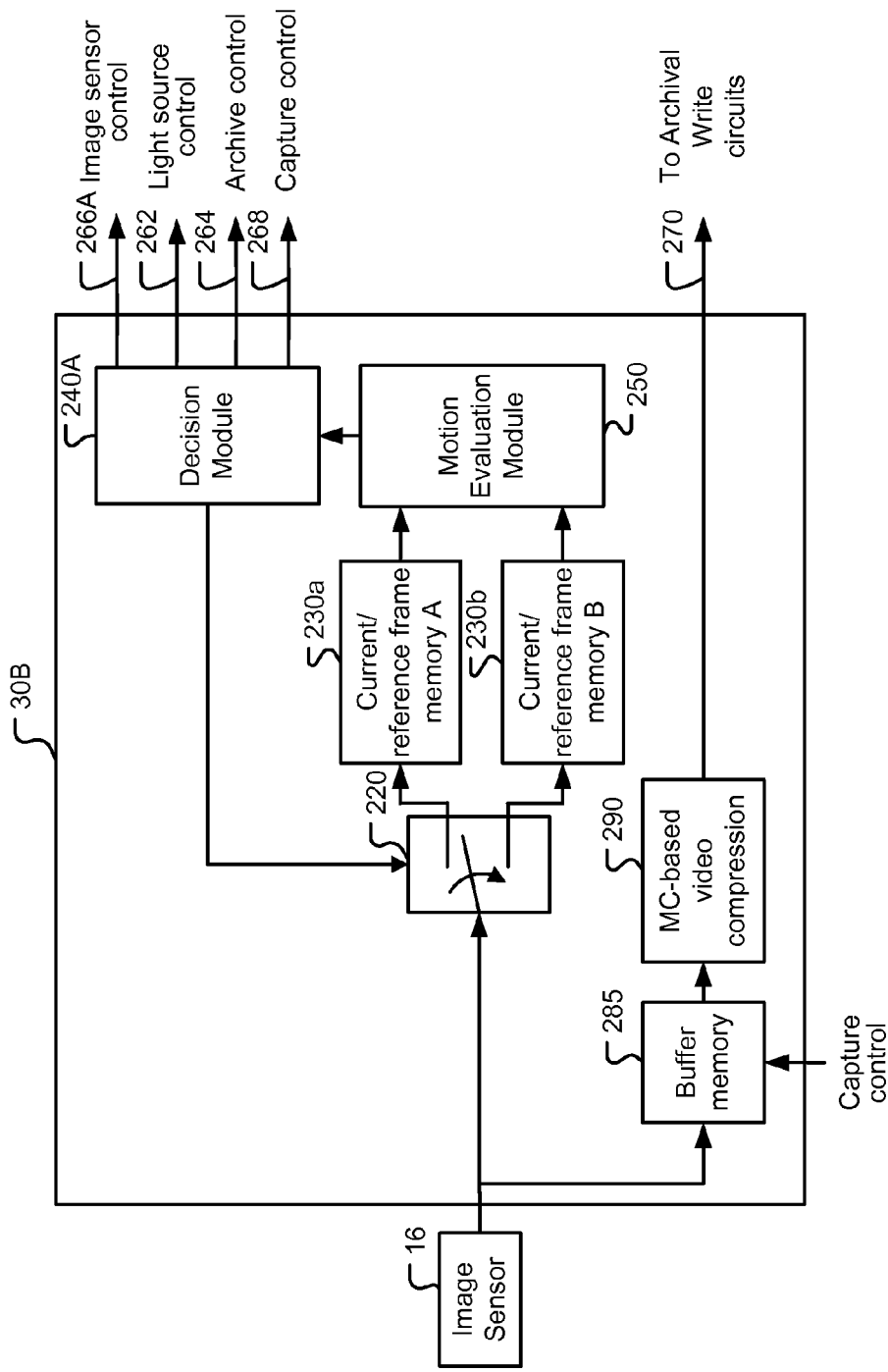
FIG. 3 illustrates another exemplary block diagram of the system processing module/controller according to one embodiment, wherein the image sensor can adjust output image size according to the image sensor control.

FIG. 3 illustrates an example of alternative system processing module/controller 30B according to another embodiment. The system processing module/controller 30B is substantially the same as the system processing module/controller 30B except that the image cropping/spatial sub-sampling module 210 is not used in FIG. 3. The selection of a desired image size usually is provided by a set of control registers in image sensor 16. For example, a set of registers may be provided to select the horizontal sub-sampling ratio, the vertical sub-sampling ratio, and starting location and horizontal/vertical sizes for region of interest (ROI). The use of ROI effectively crops the image outside the ROI. Therefore, instead of using the image cropping/spatial sub-sampling module 210, some image sensors provide the same function by programming the corresponding registers.

The decision module 240A in FIG. 3 is similar to the decision module 240 in FIG. 2 except that the decision 240A also outputs image sensor control signal 266A, which includes needed information to control the output image size of the image sensor. The image sensor control signal 266A is coupled to the image sensor for controlling the operation. For example, at the Motion Assessment phase, the image sensor may be programmed to provide partial image data to reduce computational requirement for motion metric evaluation. As an illustration, the registers of the image sensor may be programmed for 2:1 vertical sub-sampling, 2:1 horizontal sub-sampling, and a central ROI having $\frac{1}{2}$ horizontal size and $\frac{1}{2}$ vertical size. This will result in an output image that is $\frac{1}{16}$ of the full-size image. In the Capture Mode, the decision module 240A may provide image sensor control signal 266A to cause the image sensor to output a full-size as desired. In the Skip Mode, there is no need to store the image. Alternatively, low-quality images may be stored for visual confirmation or other purposes. The luminous energy will be substantially reduced, which includes turning off the light source in the Skip Mode. In addition, the image sensor can be programmed to provide an output image with substantially reduced size or no image output at all in the Skip Mode. For example, the image sensor can be programmed to provide an output image at $\frac{1}{64}$ of the full size to conserve power associated with image sensor operation and storage space. When a partial frame is used for motion evaluation in the system shown in FIG. 3, a full-size image corresponding to the current frame will not be available. Consequently, the capture decision made in the system of FIG. 3 will have to be applied to the next frame, i.e., the decision made is applied in a one-frame delay fashion.

Figure 4:
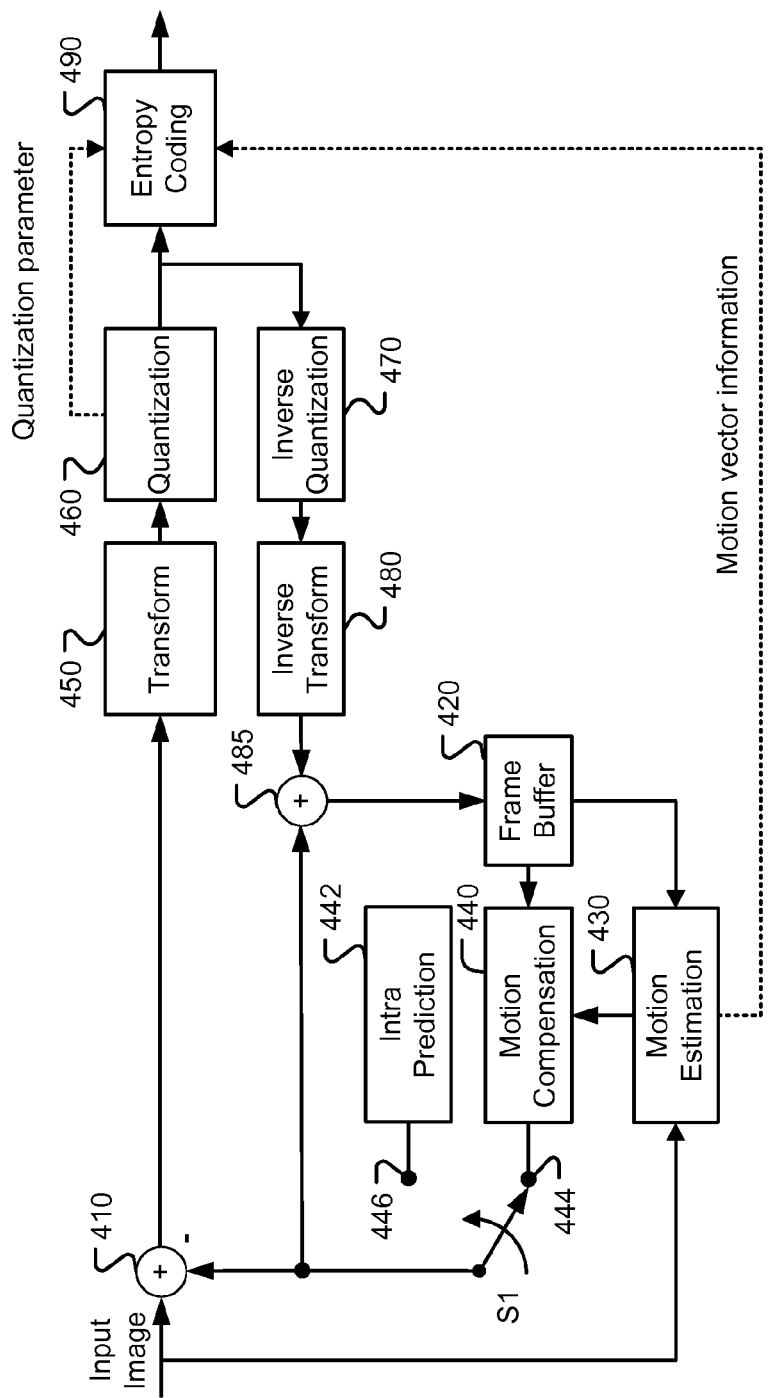
FIG. 4 illustrates an exemplary block diagram of a motion-compensated video encoding system.

FIG. 4 illustrates an example of motion compensated video encoder having adaptive intra/inter prediction. The input image is predicted either using intra prediction or motion-compensated inter prediction. Switch S1 selects between intra and inter prediction, where position 444 selects inter prediction based on motion compensation 440 and position 446 selects intra prediction 442. The motion compensated inter prediction, i.e., motion compensation 440, selects a block from a previously reconstructed frame that results in least prediction errors or least cost in terms of rate-distortion as a predictor for a block in the current frame. The location of the block in the previous frame is spatially related to the location of the current block by a motion vector, which is determined by motion estimation 430. The prediction signal is subtracted from the input image using an adder 410 to generate prediction residues. The residues are processed using transform 450 and quantization 460. The quantized transform coefficients are entropy coded to generate compressed data for storage. In addition, motion vector information and side information such as quantization parameters will also have to be stored. The motion vector and quantization parameter information may be subject to entropy coding. Since the encoder uses blocks from a reconstructed frame as predictor, the encoder has to reconstruct a frame locally. Accordingly, the residues are recovered using inverse quantization 470 and inverse transform 480. The reconstructed residues are added back to the previously frame using an adder 485 to reconstruct a current frame. The reconstructed frame is stored in the frame buffer 420.

Figure 5:
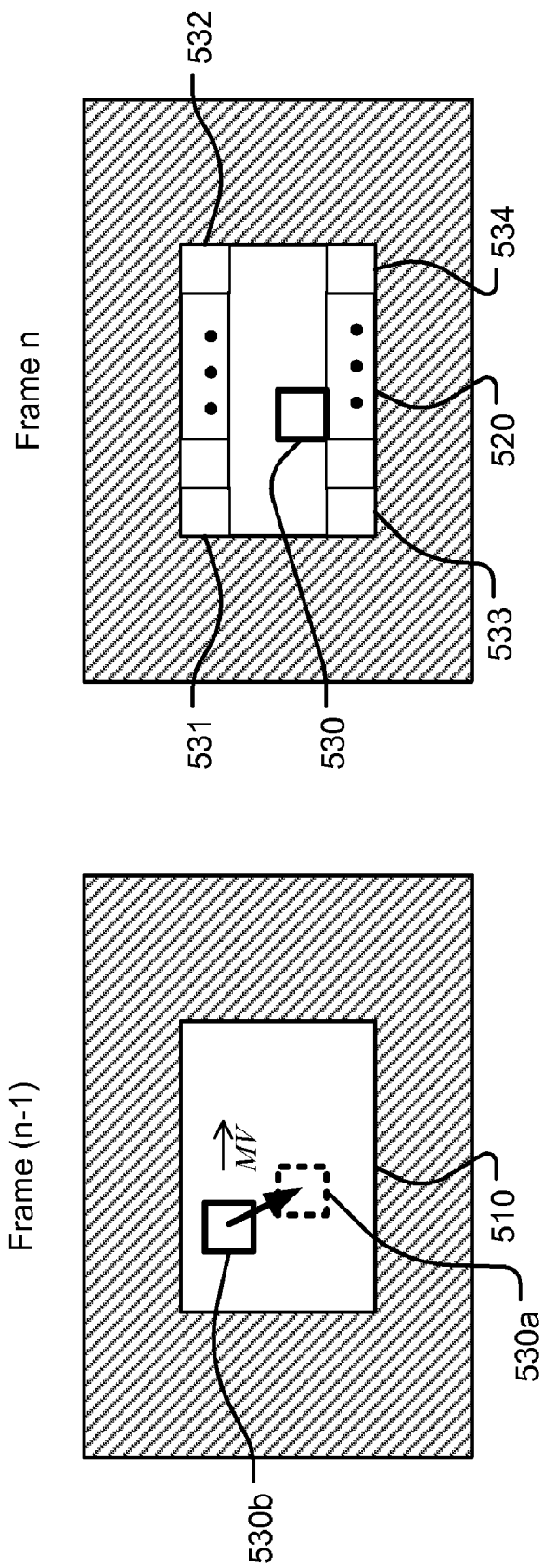
FIG. 5 illustrates exemplary motion vector determination based on a sub-image derived from the full-size/full-resolution frame by cropping.

FIG. 5 illustrates an example of block based motion estimation for the purpose of motion metric measurement. A sub-image 510 is derived from the previous frame (n−1) and a sub-image 520 is derived from the current frame n by cropping. The sub-image 520 is divided into blocks 531-534 and a motion vector is determined for a current block 530 in sub-image 520. The co-located block in frame (n−1) corresponding to the current block 530 is labeled as 530a in FIG. 5. A block 530b in frame (n−1) that results in the best match (i.e., resulting in least residues or smallest rate-distortion cost) is identified using a search algorithm or other means. The displacement $\overrightarrow{MV}$ between block 530b and block 530a is referred to as motion vector. Motion metric, such the average motion vector magnitude or counts of motion vectors exceeding a threshold, can be derived based on the motion vectors computed for the sub-image. When a frame is captured and stored, the frame is subject to motion compensated compression and the motion vector is determined for each block of the frame. The process of motion vector determination is similar to the case for the sub-image. However, the motion vectors for motion compensated compression may use finer resolution such as ½- or ¼-pel resolution for improved compression efficiency. When the system selects the Capture Mode according to the measured motion metric, a full-size and full-resolution frame is captured. In practice, a frame from the image sensor is subject to various image processing such as missing color interpolation and filtering. In order to avoid any potential artifact in pixels around the frame boarders, a few image lines and/or columns around the frame boarders may be discarded. Furthermore, a video compression system often divides a frame into blocks (for example, 8×8 or 16×16) for block-based processing; some extra lines or columns around the boarders may be discarded. In such cases, the trimmed frame is still considered as full-size.

Figure 6:
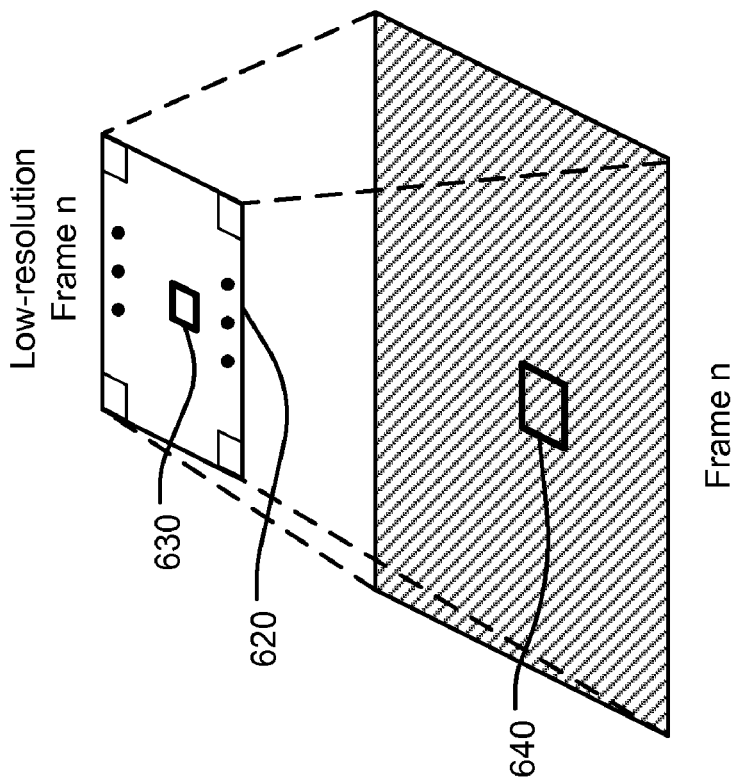
FIG. 6 illustrates exemplary motion vector determination based on a sub-image derived from the full-size/full-resolution frame by subsampling.
Figure 6:
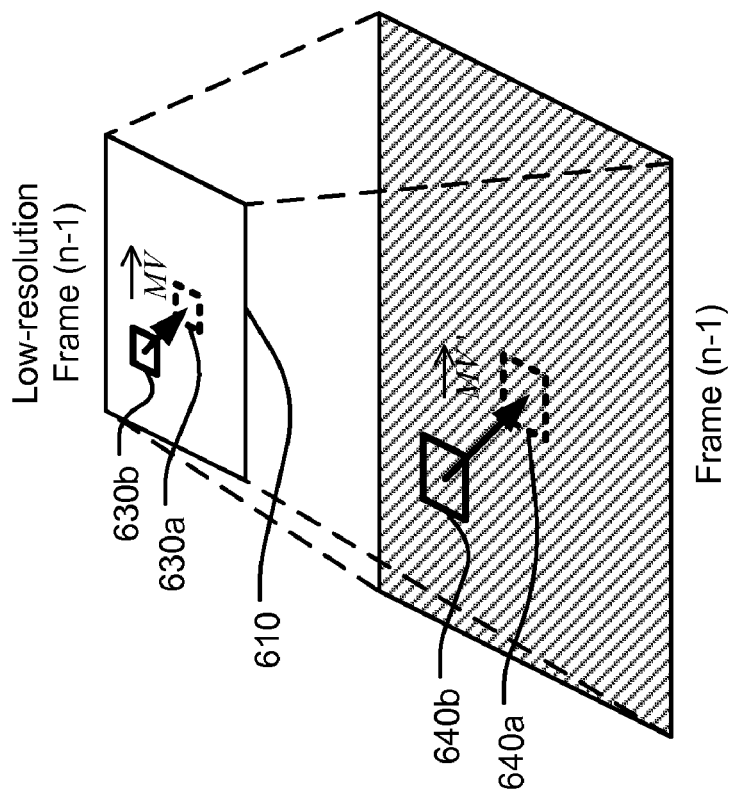

FIG. 6 illustrates an example of block based motion estimation for the purpose of motion metric measurement, where the sub-image 610 is derived from the previous frame (n−1) and the sub-image 620 is derived from the current frame n by subsampling. The example illustrated in FIG. 6 represents a 2:1 subsampling in the horizontal and vertical directions. However, other subsampling ratios may be used. Similarly, block based motion estimation can be performed between sub-image 610 and sub-image 620. Since the sub-image is a shrunk version of the frame, the motion vector calculated for the sub-image can be used to derive the motion vectors of full-resolution frame for use in motion compensated compression. For example, the motion vector corresponding to the full-resolution frame may use the motion vector corresponding to the sub-image as an initial value and refine the search around the initial motion vector. Consequently, the computations of motion vector determination for the full-resolution can be substantially reduced.

Figure 7:
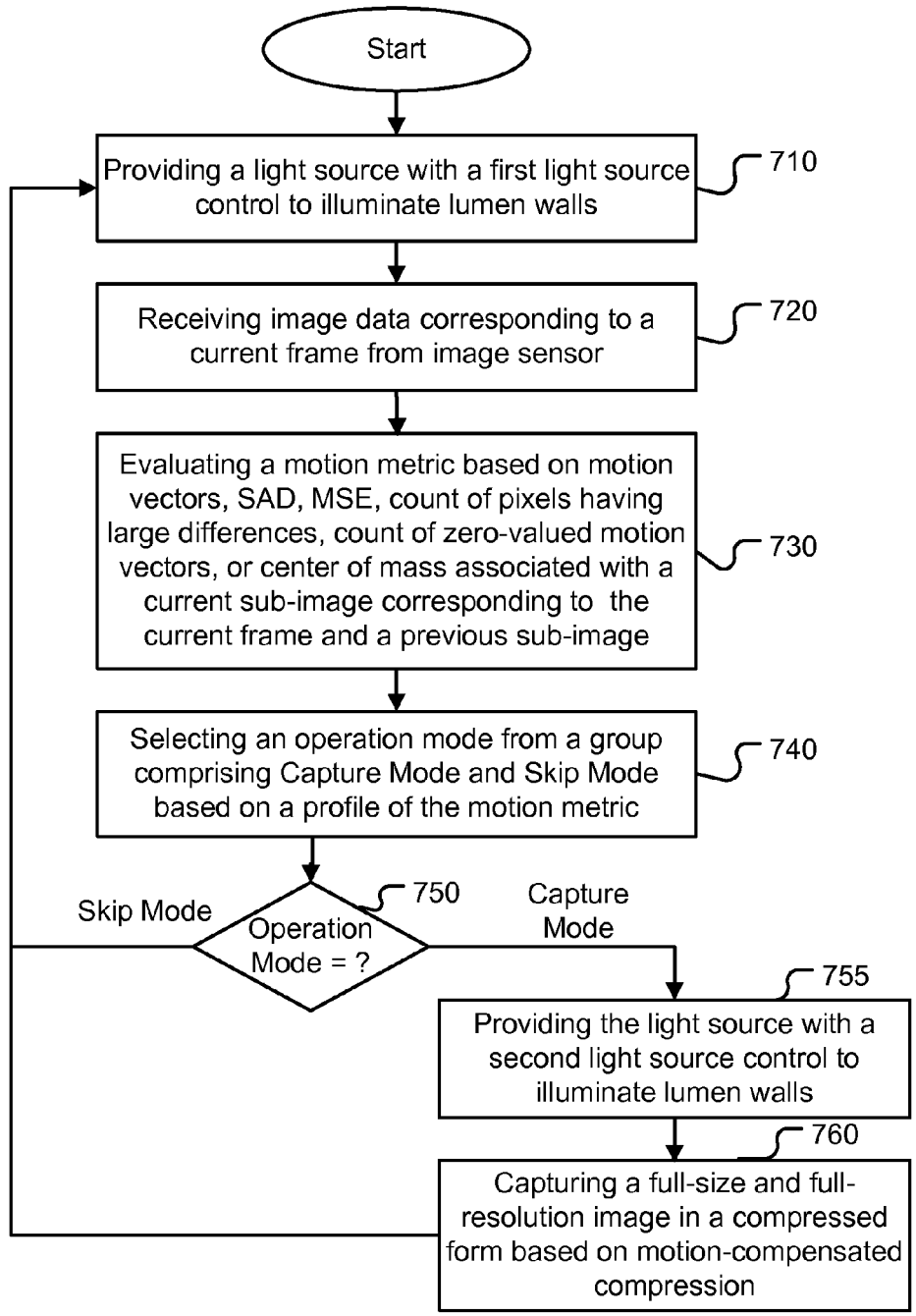
FIG. 7 illustrates an exemplary flowchart for a capsule camera incorporating image capture control based on motion metric and captured image compression based on motion-compensated compression.

FIG. 7 illustrates a flowchart to practice an embodiment of the present invention. The capsule camera starts with providing a light source with a first light source control to illuminate lumen walls in step 710. Image data corresponding to a current frame is then received from image sensor in step 720 and motion metric is evaluated in step 730. Motion metric may be based on motion vectors, SAD, MSE, count of pixels having large differences, count of zero-valued motion vectors, or center of mass associated with a current sub-image corresponding to the current frame and a previous sub-image. The motion metric is used to select between Capture Mode and Skip Mode in step 740. The capsule camera will check the mode selected in step 750. If Skip Mode is selected, the capsule camera skips image capture and return to step 710. If Capture Mode is selected, the capsule camera provides the light source with a second light source control to illuminate lumen walls in step 755 and captures a full-size and full-resolution image in a compressed form based on motion-compensated compression in step 760. After a full-size and full-resolution frame is captured and compressed, the capsule camera proceeds to step 710. The operation will repeat until enough images are captured, exiting from the human body is detected, the capsule camera power is exhausted, or other condition is met.

Figure 8:
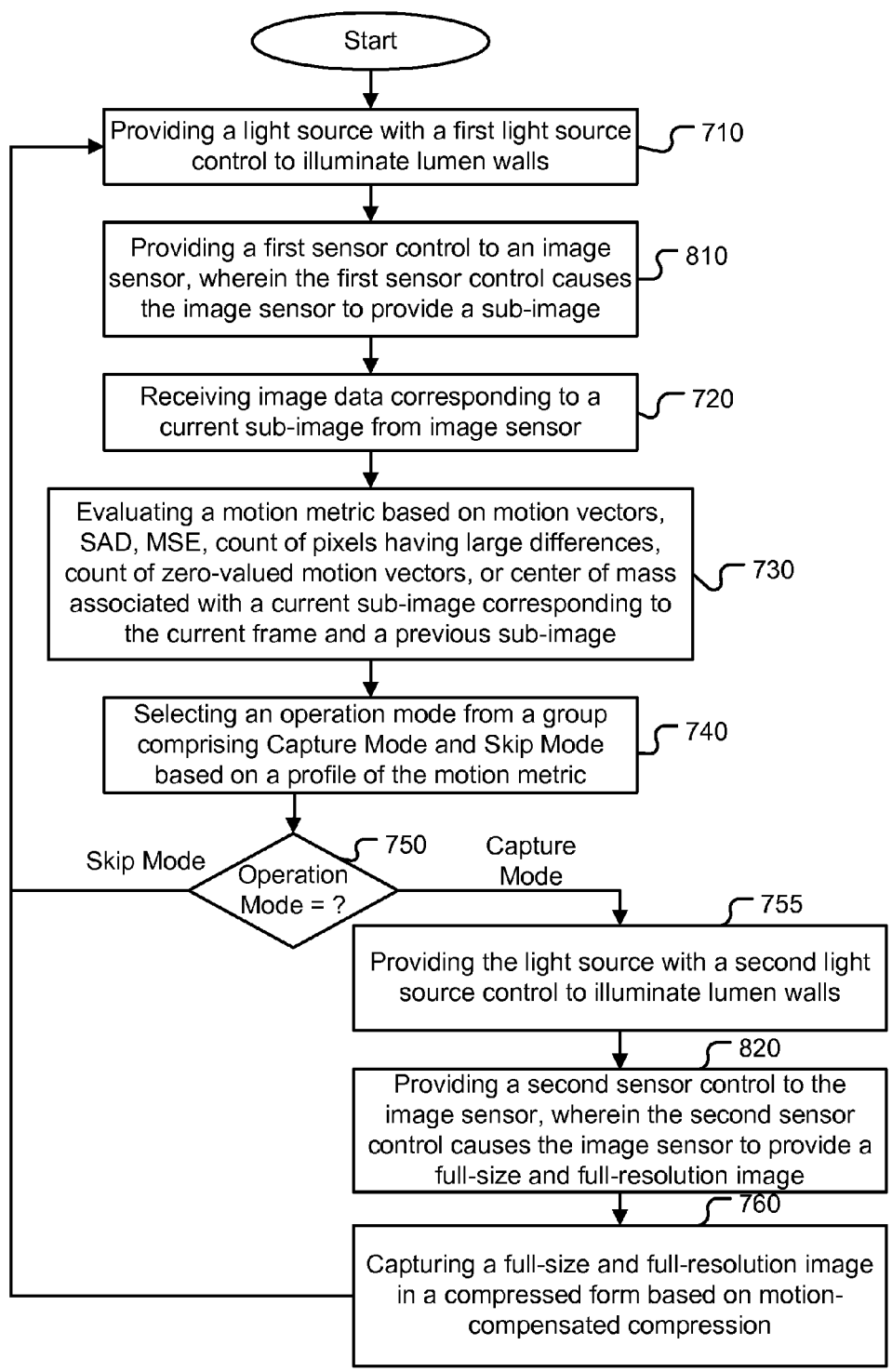
FIG. 8 illustrates another exemplary flowchart for a capsule camera incorporating image capture control based on motion metric and captured image compression based on motion-compensated compression.

FIG. 8 illustrates a flowchart to practice another embodiment of the present invention, where the sensor control is used the sensor to provide a sub-image or a full-size full resolution frame. The capsule camera starts with providing a light source with a first light source control to illuminate lumen walls in step 710. A first sensor control is provided to an image sensor in step 810, wherein the first sensor control causes the image sensor to provide a sub-image. Image data corresponding to a current frame is then received from image sensor in step 720 and motion metric is evaluated in step 730. Motion metric may be based on motion vectors, SAD, MSE, count of pixels having large differences, count of zero-valued motion vectors, or center of mass associated with a current sub-image corresponding to the current frame and a previous sub-image. The motion metric is used to select between Capture Mode and Skip Mode in step 740. The capsule camera will check the mode selected in step 750. If Skip Mode is selected, the capsule camera skips image capture and return to step 710. If Capture Mode is selected, the capsule camera provides the light source with a second light source control to illuminate lumen walls in step 755, provides a second sensor control to the image sensor, wherein the second sensor control causes the image sensor to provide a full-size and full-resolution image in step 820, and captures the full-size and full-resolution image in a compressed form based on motion-compensated compression in step 760. After a full-size and full-resolution frame is captured and compressed, the capsule camera proceeds to step 710. The operation will repeat until enough images are captured, exiting from the human body is detected, the capsule camera power is exhausted, or other condition is met.

The capsule camera disclosed herein utilizes motion evaluation to select an operation mode between Skip Mode and Capture Mode according to motion metric. The motion metric is determined based on sub-images to reduce required computation. When Skip Mode is selected, the capsule camera exercises storage space/power conservation by skipping unnecessary image capture and/or reducing luminous energy of a light source or other means for power conservation. When the Capture Mode is selected, a full-size full-resolution frame is captured and compressed using motion-compensated video compression to achieve high compression ratio. The above detailed description illustrates the specific embodiments of the present invention and is not intended to be limiting. Numerous modifications and variations within the scope of the invention are possible. The present invention is set forth in the following claims.

The invention claimed is:

1. A method for capsule camera control, the method comprising:
   (a) providing a light source to illuminate lumen walls;
   (b) receiving image data corresponding to a current frame from image sensor;
   (c) evaluating a motion metric based on motion vectors, SAD, MSE, count of pixels having large differences, count of zero-valued motion vectors, or center of mass associated with a current sub-image corresponding to the current frame and a previous sub-image;
   (d) capturing a full-size and full-resolution frame if the motion metric exceeds a threshold;
   (e) applying a compression process to the full-size and full-resolution frame captured if the motion metric exceeds the threshold;
   wherein steps (a) through (e) are performed inside a capsule camera; and
   wherein the compression process includes adaptive intra/inter frame prediction and applies intra-frame prediction for selected full-size and full-resolution frames.

2. The method of claim 1, wherein the current sub-image is designated as the previous sub-image if the motion metric exceeds the threshold.

3. The method of claim 1, wherein the current sub-image and the previous sub-image are substantially smaller than the full-size and full-resolution frame.

4. The method of claim 1, wherein the current sub-image is derived by cropping the current frame.

5. The method of claim 1, wherein the current sub-image is derived by sub-sampling the current frame.

6. The method of claim 5, wherein the motion-compensated compression utilizes the motion vectors associated with the current sub-image and the previous sub-image to derive the motion vectors associated with the current frame and a previously captured frame when the motion metric is evaluated based on the motion vectors associated with the current sub-image and the previous sub-image.

7. The method of claim 1, wherein the current sub-image is derived by using a processing module.

8. The method of claim 1, wherein the current sub-image is derived by applying a sensor control to the image sensor.

9. The method of claim 1, wherein the full-size and full-resolution frame compressed is stored in an on-board archival memory.

10. The method of claim 1, wherein the full-size and full-resolution frame compressed is transmitted using a wireless transmitter.

11. A capsule camera apparatus, comprising:
    a housing adapted to be swallowed, said housing enclosing:
    a light source to illuminate lumen walls;
    an image sensor to provide image data corresponding to a frame;
    a motion evaluator to evaluate a motion metric based on motion vectors, SAD, MSE, count of pixels having large differences, count of zero-valued motion vectors, or center of mass associated with a current sub-image corresponding to a current frame and a previous sub-image;
    a capture control module to capture a full-size and full-resolution frame from the image sensor if the motion metric exceeds a threshold;
    a motion-compensated video encoder to compress the full-size and full-resolution frame captured if the motion metric exceeds the threshold; and
    wherein the motion-compensated video encoder includes adaptive intra/inter frame prediction and applies intra-frame prediction for selected full-size and full-resolution frames.

12. The capsule camera apparatus of claim 11, wherein the current sub-image is designated as the previous sub-image if the mode is the Capture Mode.

13. The capsule camera apparatus of claim 11, wherein the current sub-image and the previous sub-image are substantially smaller than the full-size and full-resolution frame.

14. The capsule camera apparatus of claim 11, wherein the current sub-image is derived by cropping the current frame.

15. The capsule camera apparatus of claim 11, wherein the current sub-image is derived by sub-sampling the current frame.

16. The capsule camera apparatus of claim 15, wherein the motion-compensated encoder utilizes the motion vectors associated with the current sub-image and the previous sub-image to derive the motion vectors associated with the current frame and a previously captured frame when the motion metric is evaluated based on the motion vectors associated with the current sub-image and the previous sub-image.

17. The capsule camera apparatus of claim 11, further comprising a processing module to derive the current sub-image from the current frame.

18. The capsule camera apparatus of claim 11, wherein the capture control module provides a sensor control to the image sensor to cause the current sub-image.

19. The capsule camera apparatus of claim 11, further comprising an on-board archival memory to store the full-size and full-resolution frame compressed.

20. The capsule camera apparatus of claim 11, further comprising a wireless transmitter to transmit the full-size and full-resolution frame compressed.

21. A method for capsule camera control, the method comprising:
    (a) providing a light source with a first light control to illuminate lumen walls;
    (b) receiving image data corresponding to a current frame from image sensor;
    (c) evaluating a motion metric based on motion vectors, SAD, MSE, count of pixels having large differences, count of zero-valued motion vectors, or center of mass associated with a current sub-image corresponding to the current frame and a previous sub-image;

(d) selecting an operation mode from a group comprising Capture Mode and Skip Mode based on a profile of the motion metric, wherein the Capture Mode is selected if the profile indicates an amount of motion between the current sub-image and the previous sub-image exceeding a threshold and the Skip Mode is selected otherwise;

(e) providing the light source with a second light control to illuminate the lumen walls if the mode is the Capture Mode;

(f) capturing a full-size and full-resolution frame in a compressed form based on a compression process if the mode is the Capture Mode;

wherein steps (a) through (f) are performed inside a capsule camera; and wherein the compression process includes adaptive intra/inter frame prediction and applies intra-frame prediction for selected full-size and full-resolution frames.

22. The method of claim 21, wherein the current sub-image and the previous sub-image are substantially smaller than the full-size and full-resolution frame.

23. The method of claim 21, wherein the current sub-image is derived by sub-sampling the current frame.

24. The method of claim 23, wherein the motion-compensated compression utilizes the motion vectors associated with the current sub-image and the previous sub-image to derive the motion vectors associated with the current frame and a previously captured frame when the motion metric is evaluated based on the motion vectors associated with the current sub-image and the previous sub-image.

25. A capsule camera apparatus, comprising:

a housing adapted to be swallowed, said housing enclosing:

a light source coupled to a light control to illuminate lumen walls;

an image sensor to provide image data corresponding to a frame;

a motion evaluator to evaluate a motion metric based on motion vectors, SAD, MSE, count of pixels having large differences, count of zero-valued motion vectors, or center of mass associated with a current sub-image corresponding to a current frame and a previous sub-image;

a capture control module to select an operation mode from a group comprising Capture Mode and Skip Mode based on a profile of the motion metric, wherein the Capture Mode is selected if the profile indicates an amount of motion between the current sub-image and the previous sub-image exceeding a threshold and the Skip Mode is selected otherwise, and wherein the capture control module provides a first light control if the Skip mode is selected and a second light control if the Capture mode is selected a motion-compensated video encoder to compress a full-size and full-resolution frame captured from the image sensor if the mode selected is the Capture Mode; and wherein the motion-compensated video encoder includes adaptive intra/inter frame prediction and applies intra-frame prediction for selected full-size and full resolution frames.

26. The capsule camera apparatus of claim 25, wherein the current sub-image and the previous sub-image are substantially smaller than the full-size and full-resolution frame.

27. The capsule camera apparatus of claim 25, wherein the current sub-image is derived by sub-sampling the current frame.

28. The capsule camera apparatus of claim 27, wherein the motion-compensated encoder utilizes the motion vectors associated with the current sub-image and the previous sub-image to derive the motion vectors associated with the current frame and a previously captured frame when the motion metric is evaluated based on the motion vectors associated with the current sub-image and the previous sub-image.

* * * * *